Patented Mar. 22, 1927.

1,621,615

UNITED STATES PATENT OFFICE.

GEORGE F. WIKLE, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

TREATING RUBBER SURFACES.

No Drawing.   Application filed April 3, 1924. Serial No. 703,960.

My invention relates to the treatment of rubber surfaces and more particularly to the treatment of air bags which are used in the curing of tire casings. Before insertion in the raw casing the air bags are customarily inflated and tested in a water bath and are then coated with a lubricating and protecting substance to prevent adhesion of the bag to the casing and to prevent the migration of sulphur from the raw casing to the air bag during the curing process. Soapstone and mica are examples of substances previously used for this purpose. The use of such substances either in powdered form or in the form of a paint is objectionable in that they rub and flake off and are dusty and disagreeable to handle. With their use the testing bath soon becomes filled and clouded with particles of the protective substance from previously used bags, requiring frequent renewal of the testing bath.

It is one of the objects of my invention to provide a protective coating solution which shall be substantially clear and may therefore serve also as a testing bath, permitting the bag to be tested and coated at the same operation.

A further object is to provide a lubricating and protective coating which will not rub or flake off, which is clean to handle, and which gives a more complete protection against the migration of sulphur to the bag.

I have found that a mixture of hypo-sulphite of soda, glycerine and water give the desired results. Both the hypo-sulphite of soda and the glycerine possess the desired lubricating properties and the glycerine in addition tends to keep the rubber of the bag soft and in good condition. The hypo-sulphite of soda acts as an efficient barrier to the migration of sulphur from the casing to the bag. The solution being in the form of a substantially clear liquid can be used as the testing bath thereby saving the time and labor incident to separate testing and coating operations. The coating when dry has no tendency to flake or rub off.

While the proportions of the materials used may be varied within comparatively wide limits and may depend somewhat upon the character of the stock from which the bag is made, I have found that two parts of glycerine, 5 parts of hypo-sulphite of soda and 9 parts of water by weight gives good results. The hypo-sulphite of soda is first dissolved in the water and the glycerine is then added.

The bath is preferably heated when applied to the bag, as in the heated condition the glycerine is more evenly distributed and has no tendency to leave the surface of the bag tacky.

While I have described my invention with relation to the treatment of air bags it will be understood that it is equally useful in connection with any rubber surface which comes in contact with rubber, or fabric and rubber, articles during the curing process.

I claim:—

1. A coating solution for rubber surfaces comprising hypo-sulphite of soda and a softening agent.

2. A coating solution for rubber surfaces comprising hypo-sulphite of soda and glycerine.

3. A coating solution for rubber surfaces comprising hypo-sulphite of soda and glycerine in water.

4. A coating solution for rubber surfaces comprising substantially two parts of glycerine, five parts of hypo-sulphite of soda and nine parts of water, by weight.

5. The process of treating a rubber air bag which comprises inflating said bag and immersing it in a solution of hypo-sulphite of soda in water, to thereby simultaneously test and coat said bag.

6. The process of treating an air bag which comprises inflating said bag and immersing it in a solution of hypo-sulphite of soda and glycerine in water, to thereby simultaneously test and coat said bag.

7. The process of treating a rubber air bag which comprises inflating said bag and immersing it in a solution of substantially two parts of glycerine, five parts of hypo-sulphite of soda and nine parts of water, by weight to thereby simultaneously test and coat said bag.

In testimony whereof I have signed my name to the above specification.

GEORGE F. WIKLE.